United States Patent [19]

Derry et al.

[11] Patent Number: 5,088,825
[45] Date of Patent: Feb. 18, 1992

[54] HOUSING AND SUPPORT ASSEMBLY FOR RING LASER GYROSCOPE

[75] Inventors: Robert W. Derry, Stacy; Timothy J. Callaghan, Roseville; Joseph E. Killpatrick, Minneapolis; Bruce A. Seiber, Arden Hills, all of Minn.

[73] Assignee: Honeywell Inc., Minneapolis, Minn.

[21] Appl. No.: 457,911

[22] Filed: Dec. 27, 1989

[51] Int. Cl.⁵ .......................................... G01C 19/66
[52] U.S. Cl. ...................................... 356/350; 372/94
[58] Field of Search ......................... 356/350; 372/94

[56] References Cited

U.S. PATENT DOCUMENTS

4,115,004  9/1978  Hutchings et al. ............... 356/350

Primary Examiner—Samuel Turner
Attorney, Agent, or Firm—Robert A. Pajak

[57] ABSTRACT

Disclosed is a housing and support plate assembly for use with a dithered ring laser gyroscope which attenuates thermal and structural changes due to a varying environment. A dither mechanism is structurally supported between a housing and a support plate in a manner which serves to attenuate cross-axis movement and input axis tilting of the gyro assembly, and torsional stress.

14 Claims, 4 Drawing Sheets

HOUSING AND SUPPORT ASSEMBLY FOR RING LASER GYROSCOPE

FIELD OF THE INVENTION

The present invention generally relates to gas laser angular rate sensors, also known as ring laser gyroscopes, and, more particularly, to a housing and support assembly for use with ring laser gyroscopes which attenuate thermal and structural changes due to a varying environment.

DESCRIPTION OF THE PRIOR ART

Ring laser gyroscopes typically comprise a glass-ceramic block having a polygonal tunnel therein which contains a lasing gas. Cavities containing electrodes for igniting the gas are connected to the tunnel. Current between the anode and cathode which passes through at least a portion of the polygonal tunnel ignites the lasing gas. In turn, mirrors at the apices of the polygonal tunnel establish a pair of counter-propagating laser beams, having the same frequency, to travel in opposite directions through the tunnel. A frequency difference will arise between the counter-propagating laser beams in response to rotation about an axis passing through the lasing plane established by the polygonal shaped tunnel. This frequency differential is measured by sensors connected to the tunnel and is proportional to the rate of rotation.

As is well known in art of ring laser gyros, the laser block is generally dithered or oscillated relative to an inertial platform to avoid what is known as lock-in error, a phenomenon which causes performance errors due to the tendency of the counter-propagating laser beams to "lock" together at low rotation rates. This error has been obviated by the use a technique commonly referred to as rotational dithering. This technique is described in U.S. Pat. Nos. 3,373,650 and 3,467,472, which issued in the name of Joseph Killpatrick.

Present day ring laser gyros commonly incorporate a dither suspension mechanism similar to those shown in U.S. Pat. No. 4,115,004 issued in the name of Thomas J. Hutchings, et al., and U.S. Pat. No. 4,386,853 issued in the name of Bo H. Ljung, among others. These patents describe a dither spring which is mounted in as aperture through the laser block and surrounded by the ring laser optical path. The dither spring includes an outer rim member secured to the aperture walls of the laser block. A central member of the dither spring is resiliently couple to the outer rim member by spoke like members. In turn the dither spring is rigidly coupled to the inertial platform whose rotation is desired to be sensed.

A significant problem that has been encountered with ring laser gyroscopes of the prior art is that the performance of the gyro is affected by minute physical changes in the ring laser optical path and/or changes in the direction of the gyro input axis relative to the inertial platform. Changes in the ring laser optical path and the direction of the gyro input axis may be caused by structural stress on the laser block due to, for example high gravitational forces encountered in flight operation. Further, the ring laser gyro is subjected to varying environments, including temperature variations, among others, which in turn may cause minute physical changes in the dimensions of the laser block or any of its associated components and/or changes in the direction of the gyro input axis. These aforementioned changes may translate into performance output errors, i.e., rate errors. Further, varying environments, particularly varying temperature, may cause gas flow variations in the polygonnal tunnel or cavity which also may translate into gyro performance errors.

SUMMARY OF THE INVENTION

It is an object of the present invention to provide a housing and support assembly for a dithered ring laser gyro which enhances the attenuation of structural and thermally induces changes in the laser block which may affect the optical ring path about which the laser beams thereof propagate, and also attenuate any change in the direction of the gyro input axis. In the present invention, a ring laser gyro is rigidly secured to a suspension mechanism which in turn is rigidly secured between central portions of a support plate and a housing. The outer peripheral portion of the housing and the support also being rigidly secured together. The housing in the present invention is configured such that there exists selected housing symmetry relative to the gyro structure to attenuate thermal gradients across the ring laser structure.

DETAILED DESCRIPTION OF THE PREFERRED EMBODIMENTS

Figure 1:
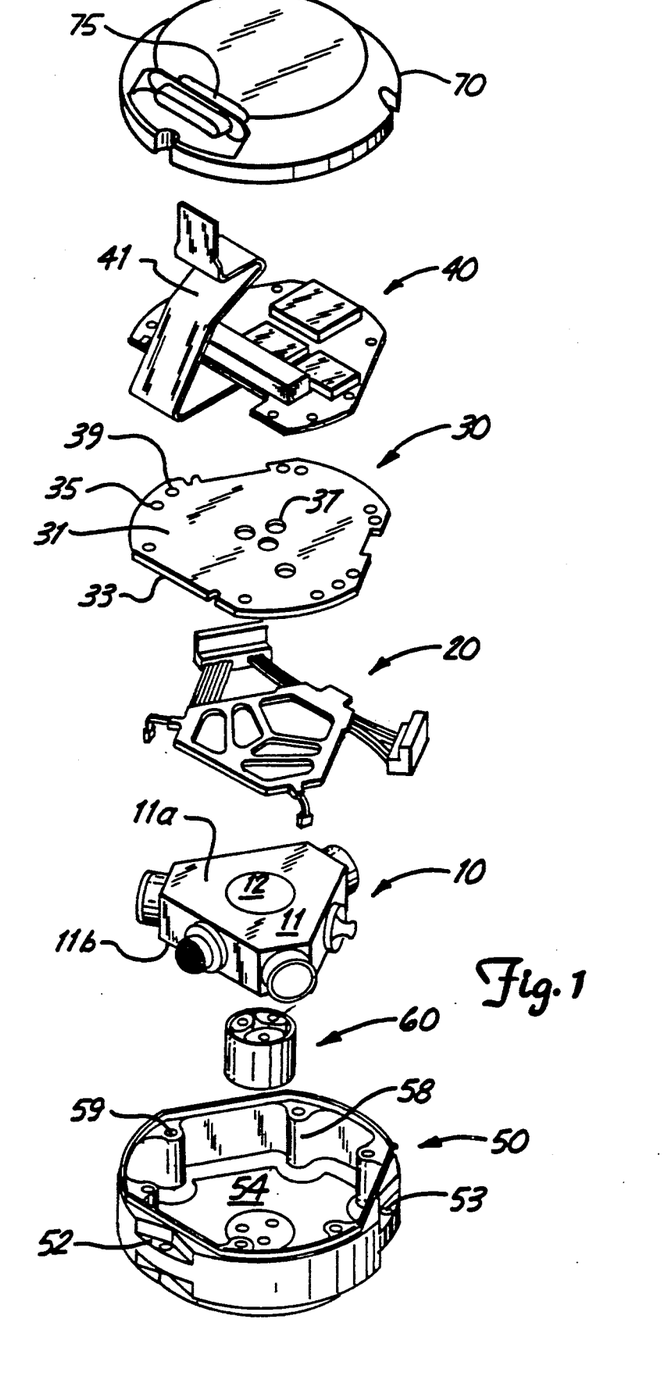
FIG. 1 is an exploded view of the ring laser gyro housing and assembly in accordance with the present invention.

FIG. 1 illustrates an exploded view of a ring laser gyro housing and support assembly in accordance with the present invention. There shown is a laser gyro assembly 10, wire harness assembly 20, support plate 30, electronics circuit card 40, cup shaped housing 50, dither spring 60, and cover 70. Ring laser gyro assembly 10 is to be suspended by dither suspension mechanism 60 from support plate 30 and housing 50. The wire harness 20 is positioned between the support plate 20 and the gyro assembly 10 to provide electrical signals from electronics card 40 to various components of the laser gyro assembly 10.

Figure 2:
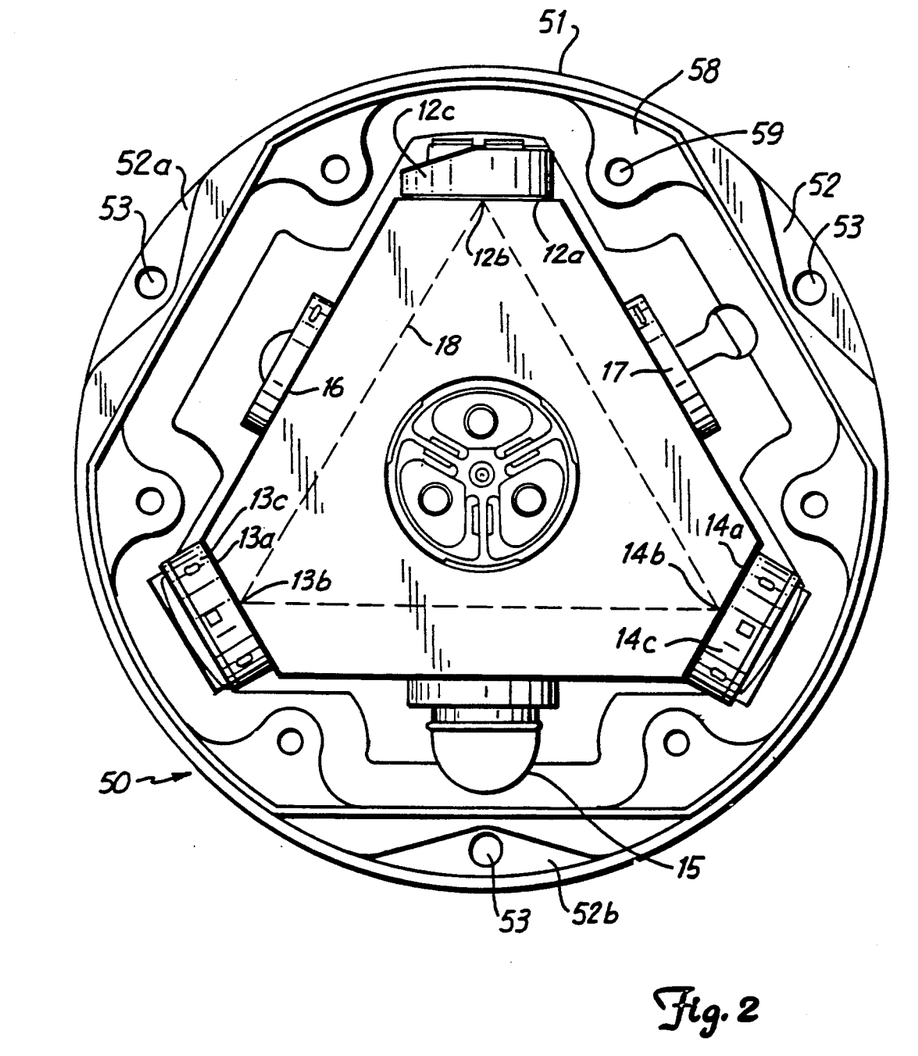
FIG. 2 is a top view of the assembly illustrating the position of the laser block assembly relative to the housing.

Now referring more particularly to FIGS. 1 and 2, the ring laser gyro assembly 10 is generally comprised of a laser block 11 substantially in a form of a triangle. Laser block 11 provides a ring laser cavity containing lasing gas. Between block surfaces 12a, 13a and 14a is a plurality of tunnels (not shown) having a polygon shape in the form of a triangle with vertices 12b, 13b and 14b at block surfaces 12a, 13a and 14a respectively. Mirror assemblies 12c, 13c and 14c are mounted to block surfaces 12a, 13a and 14a, respectively. The tunnels or cavities are filled with a lasing gas and ignited or excited by a sufficient voltage between cathode 15 and each of the anodes 16 and 17. In turn a pair of counter-propagating laser beams will counter-propagate along the optical ring path within the laser cavity as identified in the drawings by numeral 18. The ring laser optical path establishes a ring lasing plane defined by the three vertices 12b, 13b, and 14b, and also circumscribes an aperture 12 in laser block 11 to which is mounted dither suspension mechanism 60.

It should be noted that it is common practice in the art of laser gyros to provide a pair of gas discharge currents through selected portions of the polygonnal tunnel. Furthermore the pair of gas discharge currents are generally symmetrical along the polygonnal tunnel with the polarity of the gas discharge currents to be in opposite directions. This use of symmetrical an opposite polarity gas discharge currents obviates the effects of gas flow due to the ga discharge currents passing through the polygonnal tunnel which may result in gyro performance errors.

In the triangular ring path illustrated in FIG. 2, a first gas discharge current flows from anode 17 through cavity 90, tunnels 91 and 92, and cavity 93 to reach cathode 15. Similarly, a second gas discharge current flows from anode 16 through cavity 94, tunnels 95 and 92, and cavity 93 to reach cathode 15. Thus, the pair of gas discharge currents and their paths are substantially symmetrical, and thereby minimizes any gas flow effects upon the propagation of the oppositely traveling laser beams.

In the present invention, the housing is configured to have symmetry about a plane of symmetry in which the gas discharge currents are on opposite sides thereof such that the gas discharge paths will be effected by similar temperaturte gradients and thereby avoid a differential between the gas flow effects along the two gas discharge paths. The result of the housing symmetry as aforesaid results in improved gyro performance due to the attenuation of the effects caused by a varying envoronment and its effect on the ga discharge paths.

Figure 3A:
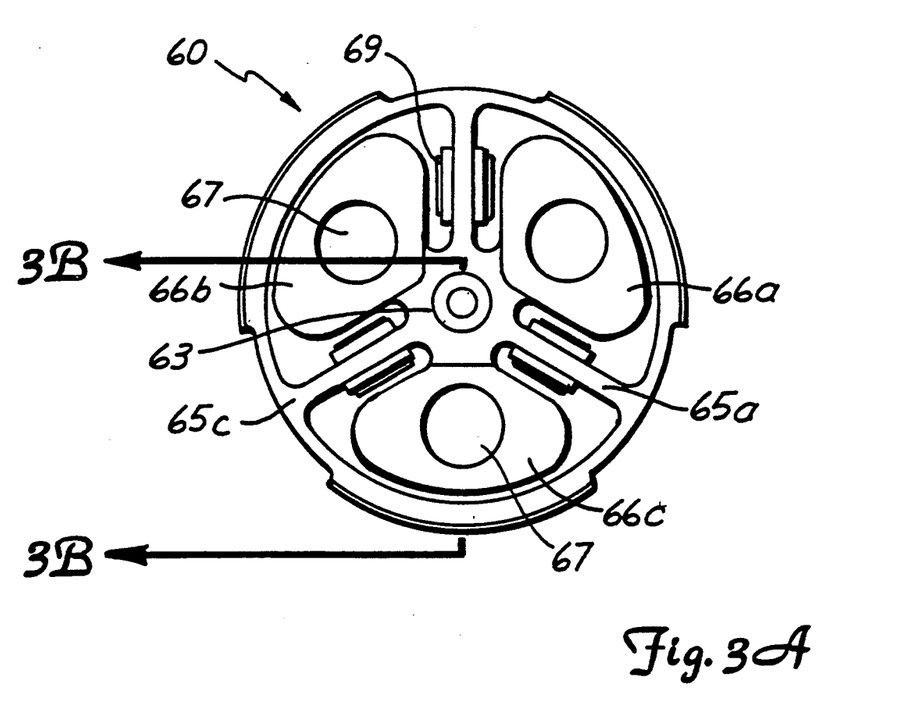
FIG. 3a and 3b is a diagrammatic drawing of one embodiment of a dither suspension mechanism.
Figure 3B:
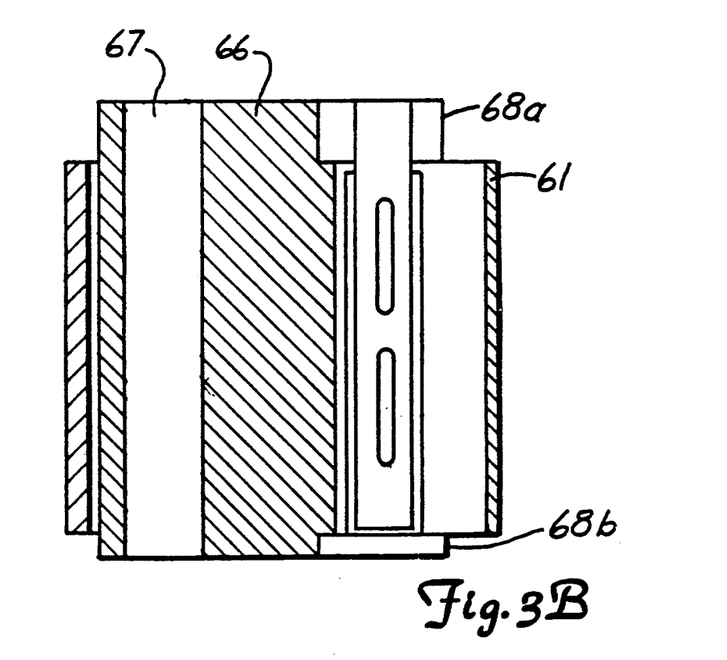

FIG. 3 shows in detail an example of a dither suspension mechanism 60 useful in dithering laser block 11. The dither suspension mechanism 60 includes an outer rim member 61, a central member 63 and resilient spoke like coupling members 65a, 65b and 65c. Central member 63 includes lobe members 66a, 66b and 66c, each having an aperture 67 therethrough. Lobe members 66a, 66b and 66c define first and second end surfaces 68a and 68b which extend beyond the limits of the outer rim member 61. The dither suspension mechanism includes a plurality of piezoelectric elements 69 mounted to the resilient coupling members 65 for torquing the outer member 61 relative to the central member 63 in a manner well known in the art.

The dither suspension mechanism 60 is rigidly fixed within the aperture 12 by cementing, or the like, for rigidly fixing the outer rim member 61 to the wall surfaces of aperture 12 in block 11.

Figure 4:
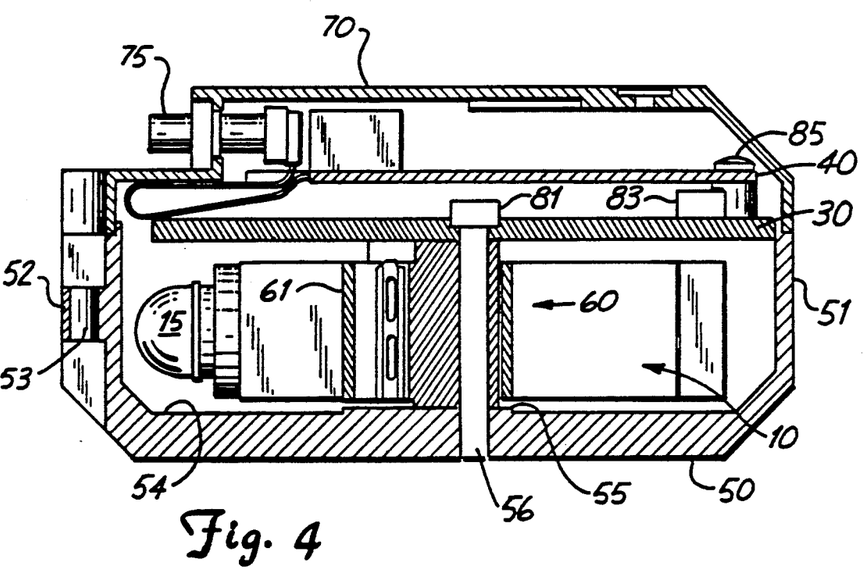
FIG. 4 is cross section of the housing and support assembly in accordance with the present invention.

Referring more particularly to FIGS. 1, 2 and 4, housing 50 is cup shaped, and includes an outer rim member 51 having a generally circular form. The outer rim member 51 includes wall portions having mounting tabs 52a, 52b and 52c formed therein, each having an aperture 53. Apertures 53 are provided for bolting housing 50 to an inertial platform. Said mounting tab defining in part a singular mounting plane for minimizing stress on the housing and laser block. It is thought that the mounting plane is preferentially aligned with the lasing plane to minimize stress on the laser block.

Housing 50 further includes an inner bottom surface 54 with a centrally located stand-off portion 55 formed therein with threaded holes 56 for receiving bolts 81 in a manner to be described. The stand off 55 is generally provided to increase the thickness of the bottom surface to secure bolts 81. Alternate fastening techniques of securing dither spring 60 to both the support plate 30 and housing 60 are within the scope of the present invention.

Housing 50 also includes support plate mounting fingers 58 having threaded apertures 59 for receiving mounting bolts 83 in a manner also to be described. Preferably the mounting fingers have sufficient mass to function somewhat like heat sinks a will be subsequently described.

Support plate 30 is generally a flat plate having a top planar surface 31 and a bottom planar surface 33. Support plate 30 includes a plurality of apertures 35 for passing through mounting bolts 8 and mating with housing apertures 59, and also includes a plurality of apertures 37 for passing through mounting bolts 81 mating with dither suspension mechanism apertures 67 and housing apertures 56. Further, support plate 30 includes threaded apertures 3 for receiving bolts 85 for mounting electronics circuit card 40 thereto. Support plate 30 is sufficiently thin to allow resiliency in a direction perpendicular to the planar surfaces, but sufficiently thick to be rigid in a direction parallel to planar surfaces.

Wire harness assembly 20 is illustrated as a flexible cable having connectors for connections to both the electronic board 40 and components of the laser gyro assembly 10. It may, for example be composed of a polyurethane material. It is intended to lie in the space between the laser gyro block surface 11a and support plate bottom surface 33.

The assembly of the ring laser gyro in accordance with the present invention is as follows, however the sequence is only exemplary. First, the dither suspension mechanism 60 is inserted into the the central block aperture 12. The outer rim member 61 of the dither suspension mechanism 60 is rigidly secured to the block aperture wall surface by cement or the like. In turn the wire harness assembly 20 is mounted to the block surface 11a below the bottom support plate surface 33 and top block surface 11a. In the exemplary fastening arrangement illustrated in the Figures, fastening bolts 81 are passed through support plate apertures 37 and the dither spring lobe apertures 67 for subsequent threading of the bolts into threaded housing apertures 56.

The dither suspension mechanism is secured to block aperture 12 in such a a manner so that with dither mechanism 60 bolted to housing 50, the apices of the laser block assembly are centrally located between adjacent pairs of housing mounting fingers 58 opposite a diagonally opposed mounting tab 52.

Support plate 30 is rigidly secured to housing 50 by mounting bolts 83 which pass through support plate apertures 35 and threaded into housing threaded apertures 59 of fingers 58.

The electronics assembly 40 is mounted to the support plate top surface 31. Connectors from wire harness assembly 20 interconnect electronic assembly 40 with gyro assembly 10. Electronic cable 41 is attached to one end of connector 75 on the inside of cover 70. Cover 70 is then welded, bolted, or cemented to outer rim member 51 of housing 50.

The advantages of the the novel assembly in accordance with present invention will now be described. Before proceeding, it should be recognized by those skilled in the art that any change in the direction of the input axis of the laser ring path would result in performance errors. Further, it should be recognized that it is desirable to maintain temperature gradients across the laser block, mirror assemblies, and associated components to a minimum.

SUPPORT PLATE

The support plate provides both structural enhancement to minimize movement of the gyro input axis (passing through the lasing plane) cause by any environmentally induced effects. This is accomplished by (i) securing the central portion of the support plate 30 to the central portion of the housing 50 through bolts 81 and thereby sandwich the dither suspension mechanism 60 between the support plate and the bottom of housing 54, and (ii) securing the outer portion of the support plate 30 to the housing outer rim member of 51. The structure as just described attenuates any possible cross-axis movement of the assembly (perpendicular to the gyro input axis) and input axis tilting. Further, the structure of the present invention also attenuates torsional stress about an axis passing through the lasing plane.

SPACING

The extension of the dither suspension mechanism creates a first space between one surface 11a of the laser block 12 and the support plate surface 33, and a second space between surface 11b of block 12 and housing inner bottom surface 54. Proper selection of the first and second spaces allows for substantially equal thermal gradient profiles across the laser block 11 surfaces. More specifically, in the embodiment of the invention as illustrated in the Figures, the wire harness assembly 20 is sandwiched between the support plate 30 and the laser block 11. Since the harness will have it own thermal characteristics due to both the electrical conductors as well as the flexible material holding the conductors therein, the temperatures effects caused by the wire harness must be taken into consideration in designing the proper spaces on both sides of the laser block. Of course, the heat disposition of the laser gyro assembly must also be taken in consideration in the the proper selection of the first and second spaces. In an actual implementation of the present invention, the space above the housing inner bottom surface was .075 inches, and the gap below the support plate was 0.10 inches and also accommodated the wire harness.

EXTERNAL HOUSING MOUNTS

The external housing mounts are rigidly secured to the inertial platform. Three housing mounts equiangularly place about the central portion of the housing minimizes thermal and structural stress induced into the housing thereby minimizing an induced structural stress on the laser block. Further, by locating the external housing mounts equidistant between the apices of the polygonal laser path optimally spreads any heat conduction along each segment of the ring laser polygonal path.

It should be noted that three housing mounts are preferable regardless of the chosen polygonal ring path. This is so since the centers of the housing mounts define a mounting plane with minimal strss on the laser block.

HOUSING SYMMETRY

The housing symmetry in the present invention is intended to provide thermal gradient symmetry in area arond each mirror. Further, and distictly separate, the housing symmetry results in the symmetrical gas discharge paths to experience substantially the same thermal gradients.

In the present invention, the housing is configured such that a plane of symmetry exists which passes through the housing and is substantially perpendicular to the lasing plane, and in which the gas discharge currents and their respective paths are symmetrical on opposite sides of the plane of symmetry. As will be seen in FIG. 2, the housing is also configured such there exists a plane of symmetry which passes through each vertice of block 11 to achieve symmetry about each mirror assembly.

More specifically, in FIG. 2 the symmetry of the housing is chosen such that there exists symmetry about a plane perpendicular to the housing bottom surface 54, and also passing through the center of an external mounting tab aperture 53 and a point opposite the same mounting tab and equidistant between two housing fingers 58. This symmetry attenuates any thermal gradients across the mirrors which can also contribute to performance errors. Further, the cavity created by the housing fingers 58 provides for minimal thermal gradients across the mirror assemblies since they function similar to heat sinks. Lastly, the gas discharge paths see substantially similar thermal gradients.

It should be noted that the housing symmetry is more generally applicable to any polygonal ring path, for example a rectangular ring laser. In these circumstances, the housing symmetry should primarily be chosen such that the symmetrical gas discharge current paths of the ring laser experience similar thermal gradients.

While the invention has been described in terms of a preferred embodiment which includes a triangular ring laser, those skilled in the art will recognize the invention can be practiced in other environments within the spirit and scope of the appended claims. Moreover, those skilled in the art will recognize that the teachings of the invention may be used with similar advantage with ring laser assemblies having polygonal shapes other than triangular, e.g. rectangular. Further, there are wide number of variation in design of a dither mechanism beyond that shown as exemplary in FIG. 3.

It should also be noted that preferably the support plate is made sufficintly thin to allow deformation thereof in a direction perpendicular to the planar surfaces thereof, and have sufficient rigidity in a direction parallel to the planar surfaces to substantially attentuate cross axis movement in a direction perpendicular to the support plate planar surfaces. However, alternatively, or additionally, the housing inner bottom surface can also be made thin to achieve the same intended fuctions as the thin suport plate.

The embodiments of an invention in which an exclusive property or right is claimed are defined as follows:

1. A ring laser gyro comprising:
   a block having a ring laser cavity containing a lasing gas, said cavity being substantially in the shape of a polygon having at least three sides and at least three vertices formed by the intersection of sides of said polygon, said block further including a central aperture therethrough, and said block having an annular shaped aperture surface defined by said aperture;
   at least three mirrors, equal in number to the number of said vertices and positioned at said vertices to create a resonant ring laser having a a polygonal ring path in the shape of said polygon thereby establishing a primary lasing plane;

a suspension mechanism having a central member with first and second en surfaces and a central axis passing through said central member first and second end surfaces, and a annular outer rim member concentric with said central axis and having an outer mounting surface secured to said aperture surface of said block, and resilient coupling means between said central member and said outer rim member;

a cup-shaped housing having an outer rim member and an inner bottom surface;

a support plate having at least one planar surface;

means for rigidly fixing a central portion of said support plate to said first end surface of said suspension mechanism;

means for rigidly fixing a central portion of said housing bottom surface to said second end surface of said suspension mechanism;

means for rigidly fixing outer portions of said support plate to said housing outer rim member; and said housing including mounting means for securing said housing to an inertial platform.

2. The ring laser gyro of claim 1 wherein said housing includes only three mounting means for defining a singular mounting plane.

3. The ring laser gyro of claim 1 wherein:

said housing includes at least three mounting means, equal in number to the number of sides of said polygonal ring path; and said dither suspension mechanism being rigidly fixed to said housing such that said mounting means are substantially equidistant between said vertices of said polygonal ring path.

4. The ring laser of claim 1 wherein said housing is configured such that there exists substantial symmetry on opposite sides of at least one plane of symmetry passing through said housing, perpendicular to said lasing plane, and which bisects a vertice of said polygonal ring path.

5. The ring laser of claim 1 wherein said housing is configured such that there exists planes of substantial symmetry which separately bisects each one of said vertices of s id polygonal ring path and in which said planes of symmetry pass through said housing bottom surface and is perpendicular to said lasing plane.

6. The ring laser of claim 1 wherein there exists a first space between said inner bottom surface and a first surface of said block in parallel with said lasing plane, and a second space between said support plate and a second surface of said block opposite said first surface thereof, said first and second spaces being selected to establish thermal symmetry within said air gaps.

7. The ring laser of claim 1 further comprising:

means for establishing a first gas discharge between two electrodes within a first selected portion of said ring laser cavity and through said lasing gas, and for establishing a second gas discharge between two electrodes within a second selected portion of said ring laser cavity and through said lasing gas; and wherein said housing is configured such that there exists substantial symmetry on opposite sides of a plane of symmetry passing through said housing, perpendicular to said lasing plane, and in which said first and second gas discharge paths are on opposite sides of said plane.

8. The ring laser of claim 7 wherein said first and second gas discharge paths are symmetrically positioned along said polygonnal path, and in which said first and second gas discharges are symmetrically positioned about said plane of symmetry.

9. The ring laser gyro of claim 2 wherein:

said polygonal ring path is in the shape of a triangle; and said dither suspension mechanism is rigidly fixed to said housing such that said mounting means are substantially equidistant between said vertices of said triangular ring path 10. The ring laser gyro of claim 9 wherein:

said housing includes three pairs of mounting fingers having sufficient mass to serve as heat spreading means, said fingers protruding inwardly from said housing outer rim member; and said block is secured to said suspension mechanism such that said laser block is positioned in said housing such that each of said vertices of said triangular ring path are substantially equidistant between one pair of said of mounting fingers; and said support plate includes outer portions rigidly fixed to said mounting fingers.

11. The apparatus of claim 1 wherein said support plate is sufficiently thin to allow deformation thereof in a direction perpendicular to said support plate planar surface, and have sufficient rigidity in a direction parallel to said support plate planar surface to attenuate cross-axis movement in a direction perpendicular to said support plate planar surface and torsional movement about an axis passing through said lasing plane.

12. The apparatus of claim 1 wherein said housing inner bottom surface is sufficiently thin to allow deformation thereof in a direction perpendicular to said housing inner bottom surface, and have sufficient rigidity in a direction parallel to said housing inner bottom surface to attenuate cross-axis movement in a direction perpendicular to said housing inner bottom surface and torsional movement about a axis passing through said lasing plane.

13. A ring laser gyro comprising:

a block having a ring laser cavity containing a lasing gas, said cavity being substantially in the shape of a polygon having at least three sides and at least three vertices formed by the intersection of sides of said polygon, said block further including a central aperture therethrough, and said block having an annular shaped aperture surface defined by said aperture;

at least three mirrors, equal in number to the number of said vertices and positioned at said vertices to create a resonant ring laser having a a polygonal ring path in the shape of said polygon thereby establishing a primary lasing plane;

a suspension mechanism having a central member with first and second end surfaces and a central axis passing through said central member first and second end surfaces, and a annular outer rim member concentric with said central axis and having an outer mounting surface secured to said aperture surface of said block, and resilient coupling means between said central member and said outer rim member;

a cup-shaped housing having a substantially circular outer rim member and an inner bottom surface;

a support plate having at least one planar surface;

means for rigidly fixing a central portion of said support plate to said first end surface of said suspension mechanism;

means for rigidly fixing a central portion of said housing bottom surface to said second end surface of said suspension mechanism;
means for rigidly fixing outer portions of said support plate to said housing outer rim member; and
said housing including mounting tabs for securing said housing to an inertial platform, said mounting tabs formed in said outer rim member and spaced inward from the outer peripheral portions of said outer rim member.

14. The ring laser gyro of claim 13 wherein said housing includes only three mounting tabs for defining a singular mounting plane.

* * * * *

UNITED STATES PATENT AND TRADEMARK OFFICE
CERTIFICATE OF CORRECTION

PATENT NO. : 5,088,825

DATED : February 18, 1992

INVENTOR(S) : Robert W. Derry; Timothy J. Callaghan; Joseph E.
Killpatrick; and Bruce A. Seiber It is certified that error appears in the above-identified patent and that said Letters Patent is hereby corrected as shown below:

Column 7, Line 43, delete "s id" and insert --said--.

Column 8, Line 38, delete "a" and insert --an--.

Signed and Sealed this

Twenty-eighth Day of September, 1993

Attest:

BRUCE LEHMAN

Attesting Officer        Commissioner of Patents and Trademarks